Patented Feb. 19, 1952

2,585,910

UNITED STATES PATENT OFFICE 2,585,910

PROCESS FOR PREPARING DIQUATERNARY SALTS OF PYRIMIDYLAMINO QUINOLINES

Norman Barton, Blackley, Manchester, Stanley Birtwell, Leeds, England, and Francis Henry Swinden Curd, deceased, late of Blackley, Manchester, England, by Muriel Ruth Curd, executrix, Bramhall, England, assignors to Imperial Chemical Industries Limited, a corporation of Great Britain No Drawing. Application November 3, 1949, Serial No. 125,373. In Great Britain November 5, 1948

5 Claims. (Cl. 260—256.4)

This invention relates to new quinoline derivatives and more particularly it relates to a process for the manufacture of new di-quaternary salts of pyrimidylaminoquinolines which are useful chemotherapeutic substances. In particular they possess valuable trypanocidal properties.

The said new compounds may be represented by the formula Pq—NH—Qq in which Pq stands for a 2-, 4- (or 6-) amino or lower alkylamino-substituted pyrimidine nucleus which is attached to the linking —NH— group at another of the 2-, 4- (or 6-) positions and which may be further substituted in the remaining 2-, 4- (or 6-) position by a lower alkyl radical or an amino group or a lower alkylamino group, Q stands for a quinoline nucleus which is substituted in the 4-position by an amino group or a lower alkylamino group and which may be further substituted by a lower alkyl group or groups, and which bears the linking —NH— group in the 6-position, provided that, if the 4-substituent of the quinoline nucleus be not lower alkylamino then the pyrimidine nucleus must bear a lower alkylamino substituent, and the symbols q indicate that the preceding nuclei, P and Q respectively, are present in the form of their quaternary salts.

It will be understood that although the new compounds in question are described herein as di-quaternary salts of pyrimidylaminoquinolines they can also be formulated and named as salts of mono-quaternary salts of dihydropyrimidyl-aminoquinolines or of pyrimidylaminodihydroquinolines or again as di-salts of dihydropyrimidylaminodihydroquinolines.

According to the invention there is provided a process for the manufacture of the said new substances of the formula Pq—NH—Qq wherein P, Q and q have the meaning hereinbefore stated which comprises reacting one or more of the substances P—NH—Q, Pq—NH—Q and P—NH—Qq with a quaternary salt-forming agent.

It will be understood that in reacting a substance of the formula P—NH—Q with a quaternary salt-forming agent the reaction may take place in a single stage or two stages. That is to say one may obtain as an intermediate product one or both of the compounds Pq—NH—Q and P—NH—Qq, and it may be necessary to isolate the desired di-quaternary salt from a mixture of products.

As suitable quaternary salt-forming agents there are for example methyl iodide, dimethyl sulphate and methyl p-toluene sulphonate.

The reaction is carried out by heating the reactants together, conveniently in a solvent which may be for example ethyl alcohol, acetonitrile or nitrobenzene. Where the tendency for the formation of intermediate products is marked the process may advisedly be carried out in a solvent of high boiling point such as nitrobenzene, or, alternatively, if the solvent is of low boiling point, in a closed vessel under reduced pressure. Where the quaternary salt-forming agent is a dialkyl sulphate it is convenient to use a dry non-hydroxylic solvent and dry nitrobenzene has been found to be particularly suitable for this purpose.

It is frequently convenient in isolation of the product to convert the quaternary salt to the salt of a different anion. Thus a dimethochloride may often conveniently be made by using as quaternary salt-forming agent dimethyl sulphate and then converting the resultant di(methomethyl sulphate) into the dimethochloride by the action of e. g. sodium chloride.

The following examples illustrate but do not limit the invention. The parts are by weight.

Example 1

1.2 parts of 4-methylamino-6-(2'-methylamino-6'-methylpyrimidyl-4' - amino)quinaldine, 12 parts of nitrobenzene and 0.8 part of dimethyl sulphate are stirred together and heated at 110° C. for 3 hours. The mixture is then cooled and filtered. The residue is washed with acetone and then dissolved in 25 parts of warm water, the solution is decolourised by means of charcoal, and is then treated with an excess of sodium iodide. It is then filtered and the solid is crystallised from 50% aqueous ethyl alcohol to give 4-methylamino - 6 - (2'-methylamino-6'-methylpyrimidyl-4'-amino)quinaldine 1:1' - dimethiodide, M. P. 308° C. (decomp.).

The starting material may be prepared as follows:

2.5 parts of 4-methylamino-6-aminoquinaldine, 1.6 parts of 4-chloro-2-methylamino-6-methylpyrimidine (Johnson and Mackenzie, American Chemical Journal, 1909, 42, 363) and 20 parts of N-hydrochloric acid are boiled under reflux for 2 hours. The mixture is then cooled and filtered. The solid is dissolved in 50 parts of water, and the solution is made alkaline to Clayton Yellow with aqueous caustic soda. It is then filtered and the residue is washed with water, and crystallised from dilute aqueous alcohol to give 4-methylamino-6-(2'-methylamino - 6 - methylpyrimidyl-4'-amino)quinaldine as the monohydrate, M. P. 277–278° C. Before use in the process of the example the monohydrate is dehydrated for example by heating in vacuo over phosphorus pentoxide.

Example 2

1 part of 4-methylamino-6-(2'-methylamino-6'-methylpyrimidyl-4'-amino)-quinaldine and 2.75 parts of methyl iodide are heated together in a closed vessel at 150–160° C. for 12 hours. The mixture is then cooled and filtered, the solid is boiled with 250 parts of water. The solution is treated with charcoal and filtered hot. 4 parts of sodium iodide are added to the filtrate, which is then cooled and filtered and the solid is crystallised from 50% aqueous ethyl alcohol to give 4-methylamino-6-(2'-methylamino-6'-methylpyrimidyl-4'-amino)quinaldine 1:1'-dimethiodide, M. P. 308° C. (decomp.).

Example 3

2 parts of 4-methylamino-6-(2'-methylamino-6'-methylpyrimidyl-4'-amino)quinaldine 1-methiodide and 19 parts of nitrobenzene are stirred together at 100° C. 1.26 parts of dimethyl sulphate are added to the mixture which is stirred at 100–110° C. for 8 hours and then cooled and filtered. The solid is washed with acetone and dissolved in 50 parts of warm water. 10 parts of sodium iodide are added to the solution. The mixture is cooled and filtered. The solid is crystallised from 50% aqueous ethyl alcohol to give 4-methylamino-6-(2'-methylamino-6'-methylpyrimidyl-4'-amino)quinaldine 1:1'-dimethiodide, M. P. 308° C. (decomp.).

The starting material is prepared by interaction of equimolecular quantities of 4-methylamino-6-aminoquinaldine 1-methiodide and 4-chloro-2-methylamino-6-methylpyrimidine in boiling dilute hydrochloric acid in a manner similar to that described above for making the starting material of Example 1. The methiodide is prepared from the methochloride hydrochloride so obtained by treating it with dilute sodium carbonate solution and adding sodium iodide. The solid is filtered and crystallised from 50% aqueous β-ethoxyethanol and 4-methylamino-6-(2'-methylamino-6'-methylpyrimidyl-4'-amino)quinaldine 1-methiodide monohydrate, M. P. 336° C. (decomp.) is obtained. For use in the process of the example the monohydrate is dehydrated for example by heating in vacuo over phosphorus pentoxide.

Example 4

1 part of 4-methylamino-6-(2'-amino-6'-methylpyrimidyl-4'-amino)quinaldine 1'-methiodide, 1.64 parts of methyl p-toluenesulphonate and 5 parts of nitrobenzene are heated together with stirring at 110° C. for 20 hours. The mixture is then cooled and filtered and the solid residue is washed with acetone and dissolved in 30 parts of hot water. The solution is treated with charcoal and sodium iodide is added in excess. The solid is filtered off and crystallised from water. 4-methylamino-6-(2'-amino-6'-methylpyrimidyl-4'-amino)quinaldine 1:1'-dimethiodide, M. P. 290° C. (decomp.) is obtained.

The starting material may be prepared as follows:

6.4 parts of 4-methylamino-6-aminoquinaldine, 8.8 parts of 4-chloro-2-amino-6-methylpyrimidine 1-methiodide and 16 parts of 2% hydrochloric acid are boiled together under reflux for 90 minutes. The mixture is then cooled and filtered. The solid is dissolved in 150 parts of hot water and the solution is treated with 15 parts of sodium iodide, cooled and filtered. The solid product is crystallised from water to give 4-methylamino-6-(2'-amino-6'-methylpyrimidyl-4'-amino)quinaldine 1'-methiodide hydriodide. 3 parts of this substance are dissolved in 1000 parts of hot 50% aqueous ethyl alcohol and the solution is cooled to 20° C. and 6.1 parts of N-sodium hydroxide solution are added, followed by 12 parts of sodium iodide. The mixture is then filtered and the monohydrate of 4-methylamino-6-(2'-amino-6'-methylpyrimidyl-4'-amino)quinaldine 1'-methiodide is obtained, M. P. 327° C. (decomp.). For use in the process of this example this product is dehydrated by heating to 130° C. in vacuo over phosphorus pentoxide.

Example 5

2.2 parts of 4-methylamino-6-(2'-amino-6'-methylpyrimidyl-4'-amino)quinaldine 1-methochloride, 22 parts of nitrobenzene and 1.7 parts of dimethyl sulphate are stirred together at 100–110° C. for 3 hours. The product is isolated in the manner described in Example 4 by conversion to the iodide and is 4-methylamino-6-(2'-amino-6'-pyrimidyl-4'-amino)quinaldine 1:1'-dimethiodide, M. P. 295° C.

The starting material, 4-methylamino-6-(2'-amino-6'-methylpyrimidyl-4'-amino)quinaldine 1-methochloride, M. P. 344° C. (decomp.) may be obtained as a monohydrate from 50% aqueous ethyl alcohol by a process parallel to that used for making the starting material of Example 3.

Example 6

1 part of 4-methylamino-6-(2'-aminopyrimidyl-4'-amino)quinoline, 6.2 parts of methyl p-toluenesulphonate and 7 parts of nitrobenzene are stirred together and heated at 120° C. for 24 hours. The mixture is cooled and filtered and the solid product is washed with acetone and crystallised from water, then redissolved in hot water and an excess of sodium iodide added to the solution which is then filtered and the solid is crystallised from water, giving 4-methylamino-6-(2'-aminopyrimidyl-4'-amino)quinoline 1:1'-dimethiodide, M. P. 330° C. (decomp.).

The starting material may be prepared as follows:

4-methylamino-6-aminoquinoline (obtained from its acetyl derivative by boiling with 20% hydrochloric acid) is condensed with 4-chloro-2-aminopyrimidine by a method similar to that described for making the starting material of Example 1, to give 4-methylamino-6-(2'-aminopyrimidyl-4'-amino)quinoline as dihydrate from aqueous ethyl alcohol, M. P. 267–268° C.

Example 7

0.7 part of 4-methylamino-6-(2'-aminopyrimidyl-4'-amino)quinoline, 8.4 parts of nitrobenzene and 0.9 part of dimethyl sulphate are stirred together and heated at 90° C. for 8 hours. The mixture is then cooled and filtered and the solid is washed with acetone, dissolved in hot water and an excess of sodium iodide is added. The solid is filtered off and crystallised from water to give 4-methylamino-6(2'-aminopyrimidyl-4'-amino)quinoline 1:1'-dimethiodide, M. P. 327° C. (decomp.).

Example 8

2 parts of 4-ethylamino-6-(2'-isopropylamino-6'-methylpyrimidyl-4'-amino)-quinaldine and 9.6 parts of methyl p-toluene sulphonate are stirred together at 100° C. for 12 hours, the mixture is then filtered and the solid is washed with acetone and dissolved in 20 parts of hot water. The solution is decolourised by means of charcoal and 3 parts of sodium iodide are added to the filtered solution. The mixture is then cooled and filtered and the solid is crystallised from water to give 4-ethylamino-6-(2'-isopropylamino - 6' - methylpyrimidyl - 4' - amino)quinaldine 1:1'-dimethiodide, M. P. 340° C. (decomp.).

The starting material used in this example may be prepared by reacting 4 - ethylamino-6-aminoquinaldine (obtained by hydrolysis of its 6-acetyl derivative with boiling 20% hydrochloric acid) with 4-chloro-2-isopropylamino-6-methylpyrimidine by a process similar to that described for preparation of the starting material in Example 1, giving 4-ethylamino-6-(2'-isopropylamino-6 - methylpyrimidyl-4'-amino)quinaldine, which crystallised from aqueous ethyl alcohol as the monohydrate, M. P. 156° C. (decomp.). Before use in the process of this example this substance is dehydrated over phosphorus pentoxide in vacuo at 150° C.

*Example 9*

1 part of 4-ethylamino-6-(2'-isopropylamino-6'-methylpyrimidyl - 4' - amino) - quinaldine, 4.8 parts of methyl p-toluene sulphonate and 4.8 parts of acetonitrile are heated together in a closed vessel at 110°–120° C. for 12 hours. The mixture is then cooled, filtered and the solid is washed with acetone and crystallised from water to give 4-ethylamino-6-(2'-isopropylamino-6'-methylpyrimidyl 1-4'- amino)quinaldine 1:1'-di-(metho-p-toluenesulphonate), M. P. 199° C.

*Example 10*

2.3 parts of 4-methylamino-6-(2':6'-diaminopyrimidyl-4'-amino)quinaldine 3'-methiodide, 20 parts of methyl p-toluene sulphonate and 10 parts of nitrobenzene are stirred together at 120-125°– C. for 18 hours. The mixture is then cooled, an excess of acetone is added to it and it is filtered and the solid is washed with acetone, dissolved in hot water, an excess of sodium iodide is added, and the mixture is cooled and filtered. The solid is crystallised from water to give 4-methylamino-6-(2':6'-diaminopyrimidyl-4'-amino)quinaldine 1:3'-dimethiodide as yellow prisms M. P. 277–280° C.

The starting material used in the process of this example may be prepared from the corresponding hydriodide by dissolving it in 50% aqueous ethyl alcohol, adding slightly more than one equivalent proportion of sodium hydroxide and then adding an excess of sodium iodide.

*Example 11*

2 parts of 4 - methylamino - 6 - (4'-amino-6'-methylpyrimidyl-2'-amino)quinaldine are stirred with 12 parts of methyl p-toluenesulphonate at 130° C. for 20 hours. The mixture is then cooled and filtered. The residue is washed with acetone, dissolved in 100 parts of hot water and the solution is decolourised with carbon, filtered, cooled and the filtrate is treated with an excess of sodium iodide. It is then filtered again and the solid is crystallised from water, giving 4-methylamino - 6-(4'-amino-6'-methylpyrimidyl-2' - amino)quinaldine 1:1' - dimethiodide, M. P. 272° C. (decomp.).

The starting material used in the process of this example may be made by condensing 4-methylamino-6-aminoquinaldine with 2-chloro-4-amino-6-methylpyrimidine by a process parallel to that used for making the starting material of Example 1. 4-methylamino-6(4'-amino-6'-methylpyrimidyl - 2' - amino)quinaldine is obtained as a hydrate from aqueous ethyl alcohol with M. P. 268–269° C. Prior to use in the process of this example it is dehydrated by heating it at 150° C./1 mm. over phosphorus pentoxide for 3 hours.

We claim:

1. A process for the manufacture of diquaternary salts of pyrimidylamino quinolines of the general formula:

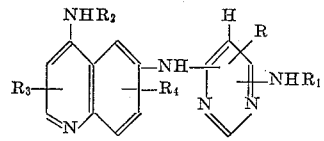

wherein R is a radical from the group consisting of hydrogen, amino, lower alkyl and —NH alkyl; $R_1$ and $R_2$ are radicals from the group consisting of hydrogen and lower alkyl without $R_1$ and $R_2$ both being simultaneously hydrogen atoms; and $R_3$ and $R_4$ are radicals from the group consisting of hydrogen and lower alkyl, which comprises reacting a compound from the group consisting of compounds of the general formula above given and the monoquaternary salts thereof with a quaternary salt forming agent.

2. A process as claimed in claim 1 wherein said salt forming agent is methyl iodide.

3. A process as claimed in claim 1 wherein said salt forming agent is dimethyl sulphate.

4. A process as claimed in claim 1 wherein said sale forming agent is methyl · p-toluene sulphonate.

5. A process as claimed in claim 1 wherein said reaction is brought about by heating the reactants together in a solvent.

NORMAN BARTON.
STANLEY BIRTWELL.
MURIEL RUTH CURD.

*Executrix of the Estate of Francis Swinden Curd, Deceased.*

No references cited.